United States Patent [19]

Tagawa

[11] 3,976,750

[45] Aug. 24, 1976

[54] PROCESS FOR THE PRODUCTION OF URANIUM TRIFLUORIDE

[75] Inventor: Hiroaki Tagawa, Tokaimura, Japan

[73] Assignee: Japan Atomic Energy Research Institute, Tokyo, Japan

[22] Filed: Dec. 20, 1973

[21] Appl. No.: 426,593

[30] Foreign Application Priority Data

Dec. 26, 1972   Japan.............................. 47-129560

[52] U.S. Cl................................. 423/258; 423/259; 252/301.1 R
[51] Int. Cl.² .......................................... C01G 43/06
[58] Field of Search.......................... 423/258, 259; 252/301.1 R

[56] References Cited

UNITED STATES PATENTS 3,034,855   5/1962   Jenkins et al....................... 423/258

*Primary Examiner*—Stephen J. Lechert, Jr.
*Attorney, Agent, or Firm*—Stevens, Davis, Miller & Mosher

[57] ABSTRACT

A novel method is disclosed for producing a pure uranium trifluoride efficiently. Said method is characterized by heating a mixture of uranium tetrafluoride and uranium nitride in an inert gas stream or under vacuum.

2 Claims, No Drawings

PROCESS FOR THE PRODUCTION OF URANIUM TRIFLUORIDE

BACKGROUND OF THE INVENTION

1. Field of the Invention

The present invention relates to a method for production of pure uranium trifluoride characterized by heating a mixture of uranium tetrafluoride and uranium nitride in an inert gas stream or under vacuum.

2. Description of Prior Art

As means of producing uranium trifluoride, two methods have been so far adopted. The present inventor comments below on these two prior art methods.

One is characterized by heating a $UF_4$ to a high temperature in an atmosphere of hydrogen gas free from oxygen and moisture to reduce the $UF_4$ to $UF_3$. And the other is characterized by heating a uranium metal in a stream of hydrogen gas to convert the uranium metal to uranium hydride, decomposing the uranium hydride to finely divide uranium metal powder under additional elevation of temperature and then fusing the mixture of $UF_4$ and the finely divided uranium metal powder to form $UF_3$ in a stream of argon gas at high ignition temperatures. Each of these two methods has its own demerit as noted below.

In the former case, because the hydrogen fluoride formed along with $UF_3$ is highly corrosive, it is very difficult to find materials for a reactor which are resistant to the corrosive effect of the hydrogen fluoride at high temperatures.

In the latter case, the finely divided uranium metal powder is very hard to handle and is apt to be contaminated with impurities, e.g. oxygen. In addition, the uranium metal powder itself is easily sintered, and therefore the reaction is rarely completed satisfactorily.

Those skilled in the art have so far believed that uranium tetrafluoride does not react with uranium nitride.

However, I, the inventor of this invention have found that uranium trifluoride can be easily produced by heating a mixture of uranium tetrafluoride and uranium nitride in a stream of inert gas (rare gas) or under vacuum.

BRIEF SUMMARY OF INVENTION

Therefore, the main object of the present invention is to provide uranium trifluoride in a state of high purity.

Another object of this invention is to provide a simple, efficient and economical process for production of uranium trifluoride.

An additional object of this invention is to provide an uranium trifluoride prepared by heating a mixture of uranium tetrafluoride and uranium nitride in a stream of inert gas.

A further object of this invention is to provide a uranium trifluoride prepared by heating a mixture of uranium tetrafluoride and uranium nitride under vacuum.

A still further object of this invention is to provide a process for the production of uranium trifluoride characterized by heating a mixture of uranium tetrafluoride and uranium nitride in a stream of inert gas or under vacuum.

These and other objects and advantages of this invention will become apparent from the specification and claims.

DETAILED DESCRIPTION OF INVENTION

According to the present invention, uranium trifluoride is produced by heating a mixture of uranium tetrafluoride and uranium nitride in the form of powder or molding in a stream of inert gas or under vacuum. In this invention, uranium sesquinitride ($U_2N_3$) or uranium mononitride (UN) can be used for the starting material.

The reaction for the preparation of uranium trifluoride from uranium tetrafluoride and uranium mononitride is shown in Eq. 1:

$$3UF_4 + UN = 4UF_3 + \tfrac{1}{2}N_2 \qquad \text{Eq. 1}$$

The reaction for the preparation of uranium trifluoride from uranium tetrafluoride and uranium sesquinitride is shown in Eq. 2:

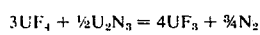

$$3UF_4 + \tfrac{1}{2}U_2N_3 = 4UF_3 + \tfrac{3}{4}N_2 \qquad \text{Eq. 2}$$

The nitrogen gas formed is released outside the system.

The invention of this application can be worked at temperatures in the range of 700° – 1000°C; however, it is preferably worked at temperatures ranging from 900°C to 950°C. Since uranium tetrafluoride evaporates at temperatures above 1000°C, the reaction temperatures should be selected from the range below 1000°C.

The same results can be obtained if the reaction is worked either under vacuum or in a stream of inert gas, e.g. He, Ar, etc.

In accordance with this invention, uranium trifluoride can be produced at a commercially practicable reaction rate.

Since both the starting materials (uranium tetrafluoride and uranium nitride) used in this invention can be produced in a state of high purity, a minimum amount of impurities is left in the uranium trifluoride produced. The impurity content of the finished product does not exceed that of the starting materials.

And furthermore, since no corrosive gases are produced by this invention, this invention can be worked easily at high temperatures.

This invention will be further described by reference to the following specific examples. It should be understood, however, that although these examples may describe in detail certain preferred operating conditions and/or materials and/or proportions, they are provided primarily for the purpose of illustration and the invention, in its broader aspects, is not limited thereto.

EXAMPLE 1

Both uranium tetrafluoride ($UF_4$) and uranium mononitride (UN) containing 5.53 percent nitrogen by weight were finely powdered and passed through a sieve of 200 mesh.

And then, the powdered uranium tetrafluoride ($UF_4$) and uranium mononitride (UN) were mixed together, the proportions of $UF_4$ to UN being 3.74:1 by weight, and molded into pellets. The pellets were then placed in a quartz crucible lined with a nickel plate, and thereafter, the quartz crucible was placed in a quartz reaction tube, which was then evacuated to $10^{-5}$ mmHg and sealed to make a vacuum system. The system was maintained at 950°C for 30 min.; then the nitrogen gas formed in the system was removed and the system was cooled.

Single-phase uranium trifluoride was obtained in a 98.5% yeild.

EXAMPLE 2

Uranium tetrafluoride ($UF_4$) and uranium sesquinitride ($U_2N_3$) containing 8.61 percent nitrogen by weight were mixed together, the proportions of $UF_4$ to $U_2N_3$ being 3.61:1 by weight, and molded into pellets. The thus formed pellets were then placed in a quartz boat lined with a nickel plate, which was subsequently heated to 900°C and held then for 60 min. in a quartz reaction tube in a stream of argon gas of high purity.

A single-phase uranium trifluoride was obtained in a 97.0% yield.

Since the scope of the present invention has been stated broadly in the foregoing description that is by no means restrictive but merely illustrative, it should be liberally interpreted so as to obtain the benefit of all its equivalents to which I believe this invention is justly entitled.

What is claimed is:

1. A process for the production of uranium trifluoride, comprising heating a mixture of uranium tetrafluoride and uranium nitride selected from the group consisting of uranium mononitride and uranium sesquinitride, at a temperature in the range of 700°C to 1000°C, in a stream of inert gas or under vacuum.

2. A process according to claim 1 wherein the mixture is heated at temperature in the range of 900°C to 950°C.

* * * * *